United States Patent
Arjonilla et al.

(10) Patent No.: US 10,988,304 B1
(45) Date of Patent: Apr. 27, 2021

(54) DEVICE FOR FLEXIBLE RING, TRANSPORTING, AND INSULATING SINGLE BEVERAGE CONTAINERS

(71) Applicant: RKSA, LLC, Chula Vista, CA (US)

(72) Inventors: Steven Arjonilla, San Diego, CA (US); Gianfranco Falk, San Diego, CA (US)

(73) Assignee: RKSA, LLC, Chula Vista, CA (US)

( * ) Notice: Subject to any disclaimer, the term of this patent is extended or adjusted under 35 U.S.C. 154(b) by 164 days.

(21) Appl. No.: 15/623,731

(22) Filed: Jun. 15, 2017

(51) Int. Cl.
| B65D 39/00 | (2006.01) |
| B65D 81/18 | (2006.01) |
| B67B 7/16  | (2006.01) |
| B65D 81/38 | (2006.01) |
| A47G 23/02 | (2006.01) |

(52) U.S. Cl.
CPC ..... B65D 81/3881 (2013.01); A47G 23/0241 (2013.01); B65D 39/00 (2013.01); B65D 81/18 (2013.01); B67B 7/16 (2013.01); *A47G 2023/0275* (2013.01)

(58) Field of Classification Search
CPC ..... F25D 2303/0846; F25D 2303/0841; F25D 2303/0843; B65D 1/0269
USPC ........................................................ 220/739
See application file for complete search history.

(56) References Cited

U.S. PATENT DOCUMENTS

| 460,918 | A | 10/1891 | Kraetzer |
| 2,163,568 | A | 6/1939 | Schlumbohm |
| 3,229,840 | A | 1/1966 | Filleul |
| 4,510,769 | A | 4/1985 | McClellan, Jr. |
| 4,570,454 | A * | 2/1986 | Campbell .......... A47G 19/2227 215/13.1 |
| 4,811,858 | A | 3/1989 | Augur |
| 4,823,974 | A | 4/1989 | Crosser |
| 4,870,837 | A | 10/1989 | Weins |
| 6,604,649 | B1 | 8/2003 | Campi |
| 6,793,076 | B1 | 9/2004 | Luo et al. |
| 8,544,678 | B1 | 10/2013 | Hughes |
| 2002/0088810 | A1 | 7/2002 | Murakami |
| 2005/0194345 | A1 | 9/2005 | Beggins |
| 2007/0056314 | A1* | 3/2007 | Mali ....................... F24V 30/00 62/389 |
| 2009/0172888 | A1* | 7/2009 | Garman .................. B67B 7/403 7/152 |
| 2016/0318693 | A1* | 11/2016 | Hein .................... B65D 51/242 |
| 2017/0137176 | A1* | 5/2017 | Gorbold ................. B65D 39/08 |
| 2017/0137207 | A1* | 5/2017 | Mackintosh ........ A47G 23/0241 |
| 2017/0349357 | A1* | 12/2017 | Yu ........................ B65D 1/0246 |
| 2018/0086540 | A1* | 3/2018 | Haas ...................... B65D 81/38 |

* cited by examiner

*Primary Examiner* — Jianying C Atkisson
*Assistant Examiner* — Meraj A Shaikh
(74) *Attorney, Agent, or Firm* — Lee & Hayes, P.C.

(57) ABSTRACT

A beverage container assembly that includes a cap member, a connecting neck member, a body member and a flexible ring member. The body member is configured to receive a bottle or beverage container via an opening on the top surface and the flexible ring member is configured to be positioned between the bottle or beverage container and the connecting neck member during use.

20 Claims, 13 Drawing Sheets

US 10,988,304 B1

DEVICE FOR FLEXIBLE RING, TRANSPORTING, AND INSULATING SINGLE BEVERAGE CONTAINERS

BACKGROUND

At many venues and events, a beverage may be opened by an individual and the contents consumed over an extended period of time. Unfortunately, at particular venues, such as the beach, the temperature of the contents may increase to a value that the beverage loses at least some of its appeal to the consuming individual. Additionally, at some venues the beverage may need to be transported or temporarily closed to prevent spilling or contamination until consumed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
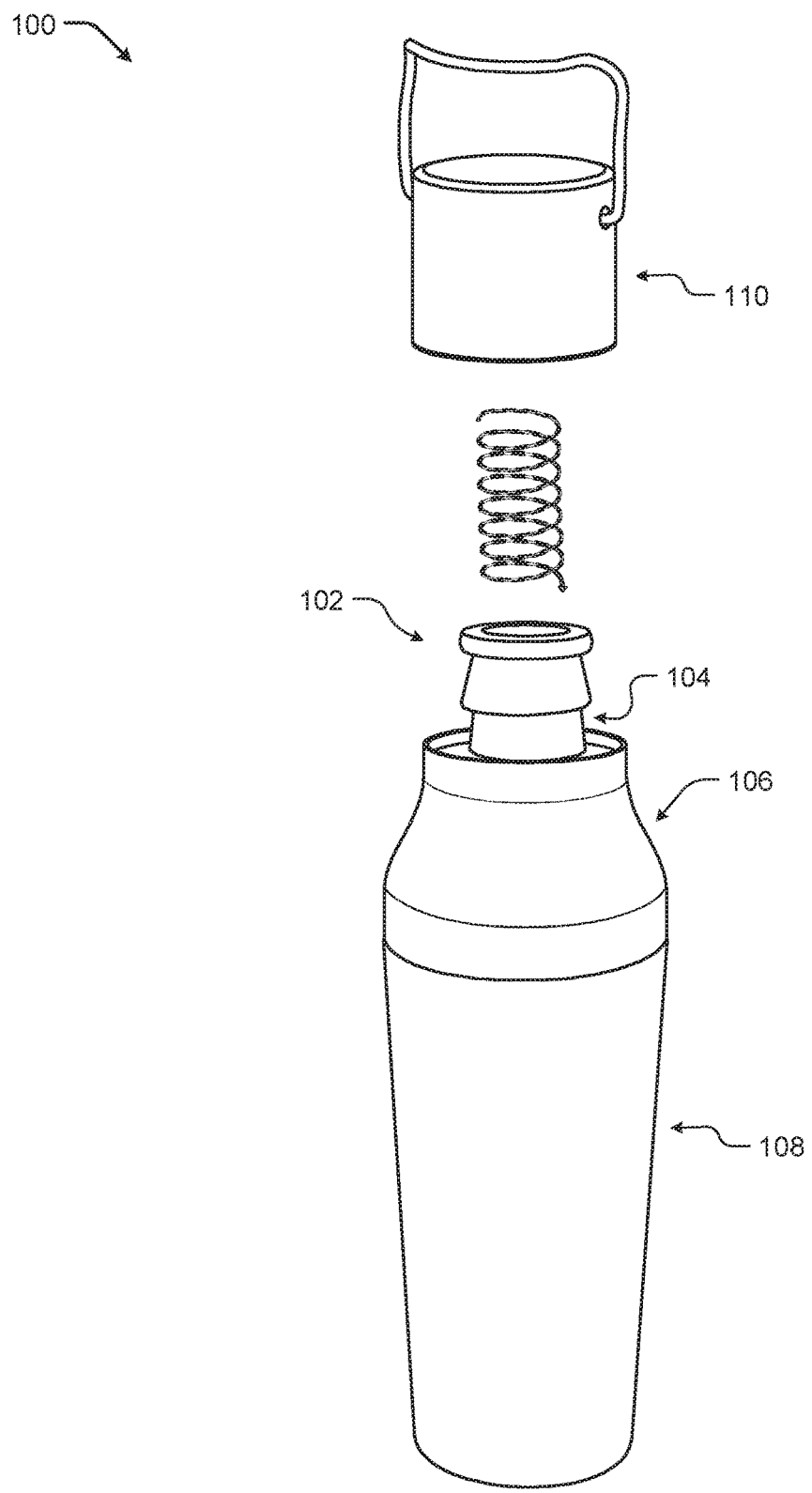
FIG. 1 illustrates an example exterior view of a container for storing a beverage bottle having a neck according to some implementations.

This disclosure includes techniques and implementations associated with providing a beverage container configured to insulate and, in some cases, seal contents of the beverage during a period associated with consumption. For instance, at many venues and events (e.g., parks, beaches, sporting arenas, etc.), beverages are stored in a large cooler with water and ice. The larger cooler is effective at keeping the sealed beverages at a desired consuming temperature. However, once a beverage is opened the contents of the beverage begins to warm until reaching a temperature substantially equal to the room temperature or environmental temperature. Thus, if the beverage is not consumed within a short period of time following removal from the cooler, the beverage loses at least some of its appeal and refreshing characteristics. This may be a particular problem at venues such as the beach where the beverage may be opened and placed on a table in direct sunlight, while the consuming individual reads a book or enjoys a swim.

Additionally, at some venues (e.g., pools or beaches) the beverage may need to be temporally sealed when the beverage is not being presently consumed to, for instance, prevent water or other containments from mixing with the contents of the beverage. In another instance, if the open beverages need to be transported, the beverages may be resealed or the beverage container closed to prevent spilling of the liquid is a likely event, in some cases, such as a concert, thereby ruining the entire experience. Conventional solutions often either insulate the beverage or attempt to seal the beverage against leaks but not both, therefore the conventional solutions fail to meet the needs of the average consumer.

In some situations, a consumer may attempt to carry replacement containers which may include lids that seal and/or have insulating properties. However, the replacement containers are often rigid and require pouring or transferring the contents of the beverage container into the replacement container, often times resulting in the spill that the replacement container was intended to avoid. Additionally, the rigid nature of the replacement containers often makes them bulky and hard to transport to the venues, particularly, in some venues, such as concert and sporting arenas, where space is often extremely limited. Thus, in some implementations, the beverage container storing device described herein both seals and insulates the beverage within the original beverage container.

In one implementation, the beverage container may be formed using multiple components. For example, the beverage container may include a cap member, a connecting neck member, a body member, and a flexible ring member. The cap member may be configured to engage or mate with the top surface of a bottle, such that when the cap member is properly positioned over the top surface of the bottle, the cap member seals the bottle (e.g., the beverage) against spills. For example, the cap member may be formed from a ridged material, such as aluminum, and include a flexible portion such as rubber or a polymer that engages the mouth or opening of the bottle.

The body member is configured to fit around the main portion or body of the bottle, such as between a consumer's hand and the beverage container. Thus, the body member may have an body formed from stainless steel or aluminum that defines a cavity or space that is vacuum filled to provide insulting properties from both the environment and a consuming individual's hand. For example, the body member may be a double walled steel vacuum design. In general, the neck of the bottle may extend past the top surface or rim of the body member.

The connecting neck member may also be formed from a ridged material, such as steel or aluminum, and be configured to mate with the cap member and the body member. For example, an individual may place the bottle within the body member via an opening at the top of the body member, mate the connecting neck member with the body member via, for instance, male and female threads on the respective members. The connecting neck member may also be configured to mate with the cap member, via threads, pressure seal, etc. such that when the cap member is secured to the connecting neck member the bottle is sealed from leaks and spills. In this manner, unlike conventional beverage containers, the bottle may be placed within the body member via an opening at the top of the body member, thereby reducing the risk of spills as the bottle and the beverage container (e.g., the body member) remain in an upright position, while the beverage container is still able to receive a cap member over the lip or opening of the bottle when the beverage is being stored (e.g., not being actively consumed).

In some cases, the connecting neck member and the cap member may also be formed from a double walled vacuum to provide strength as well as insulating properties to the entire beverage container. Further, in conventional containers, the shape, size or length of the neck of a bottle may allow the bottle to move within the closed beverage container, which often results in spilling. Alternatively, in conventional containers, the cap member may be configures to accommodate only limited (e.g., often a single) bottle design to prevent the spilling of the beverage within the conventional container. However, unlike the conventional containers, the beverage container discussed herein includes a flexible ring member may be configured to fit between the bottle and the connecting neck and/or the body member of beverage container to lock or hold the bottle in place regardless of neck size and shape. For instance, the flexible ring member may be a ring formed from a flexible material, such as a silicone base material, rubber, or polymer, that fits over the neck of the bottom and rests snuggly on the shoulders of the bottle. The ring may fit over the bottle such that when the connecting neck member is secured to the body member, the connecting neck member applies inward and/or downward pressure from all directions on the flexible ring member which in turn applies the inward and/or downward pressure on the shoulders of the bottle. In this manner, the pressure is able to prevent the bottle from moving within the container regardless of bottle size, dimensions, and shape. Thus, the flexible ring member allows the beverage container to accommodate and secure differing sizes of the necks associated with the bottles.

In some cases, the flexible ring member may be formed from multiple rings. For example, a first ring may be configured to fit or mate within the second ring. In this manner, depending on the size of the bottle within the beverage container, either the first and second ring may be used to secure the bottle or only the second ring may be used to secure the bottle. Thus, by using a bifurcated flexible ring member, the beverage container may be able to accommodate a larger collection of bottle shapes and sizes. In one particular implementation, one of the first ring or second ring may be a freezer ring or act as an ice pack. For example, the freezer ring may be filled with water or a refrigerant gel, which may include water, a water-soluble starch, a water-soluble cellulose, or combination thereof that may be cooled or frozen prior to placement within the beverage container. The freezer ring may then act to cool or resist a warming of the beverage placed within the beverage container (such as cooling contents of an open bottle while the contents are consumed).

FIG. 1 illustrates an example exterior view of a container 100 for storing a beverage bottle 102 having a neck 104 according to some implementations. In the current example, the bottle 102 has been placed within the beverage container 100 and a connecting neck member 106 of the beverage container 100 has been secured to the body member 108 of the beverage container 100. However, in the current example, a cap member 110 of the beverage container 100 has been removed, for instance, to allow an individual to consume the contents of the bottle 102, while the bottle 102 remains within the beverage container 100.

In some cases, by providing the beverage container 100 that allows the individual to consume the contents of the bottle 102, while the bottle 102 remains secured within the container 100, the contents of the bottle 100 may be insulted and/or cooled to prevent the contents of the bottle 100 from warming during a period of time associated with consumption of the contents. Additionally, by providing the beverage container 100 that receives the open bottle 102, the contents of the bottle 102 do not need to be relocated or removed from the bottle 102 reducing the risk of spilling the contents during the relocation (e.g., a spilling of the contents as the liquid contents are poured from the bottle into a secondary container).

In some cases, the exterior of the beverage container 100 may be formed as a stainless steel or steel double walled vacuum. In these cases, the vacuum filled cavity within the double wall may act as an insulation barrier to prevent or reduce the extent to which the environmental temperature is able to influence the temperature of the contents of the bottle 102. In some examples, the fully assembled beverage container 100 from the top surface of the cap member 110 and the bottom surface of the body member 106 may be between approximately eight inches in height to approximately twelve inches in height. In one particular example, the fully assembled beverage container 100 from the top surface of the cap member 110 and the bottom surface of the body member 106 may be approximately ten and one fourth inches in height.

In some cases, the width of the beverage container 100 may vary between approximately one inch across and approximately five inches across. In one specific example, the beverage container 100 may vary from approximately one and half inches across to approximately three inches across. For instance, the cap member 110 may be approximately one and half inches across and the body member 108 may be approximately three inches across.

In another example, the beverage container 100 may be sized to receive a twenty-two-ounce bottle opposed to the twelve-two bottle 102 shown in the illustrated example. In this example, the beverage container 100 may be between approximately ten inches and approximately fourteen inches in height fully assembled and the body member 108 may have a diameter of between approximately three inches and approximately five inches. In one particular example, the twenty-two ounce bottle may have a body member 108 that is approximately eight inches in height and approximately three and half inches in diameter, a cap member 110 that has a height of one inch and a connecting neck member 106 that has a height of approximately three inches.

Figure 2:
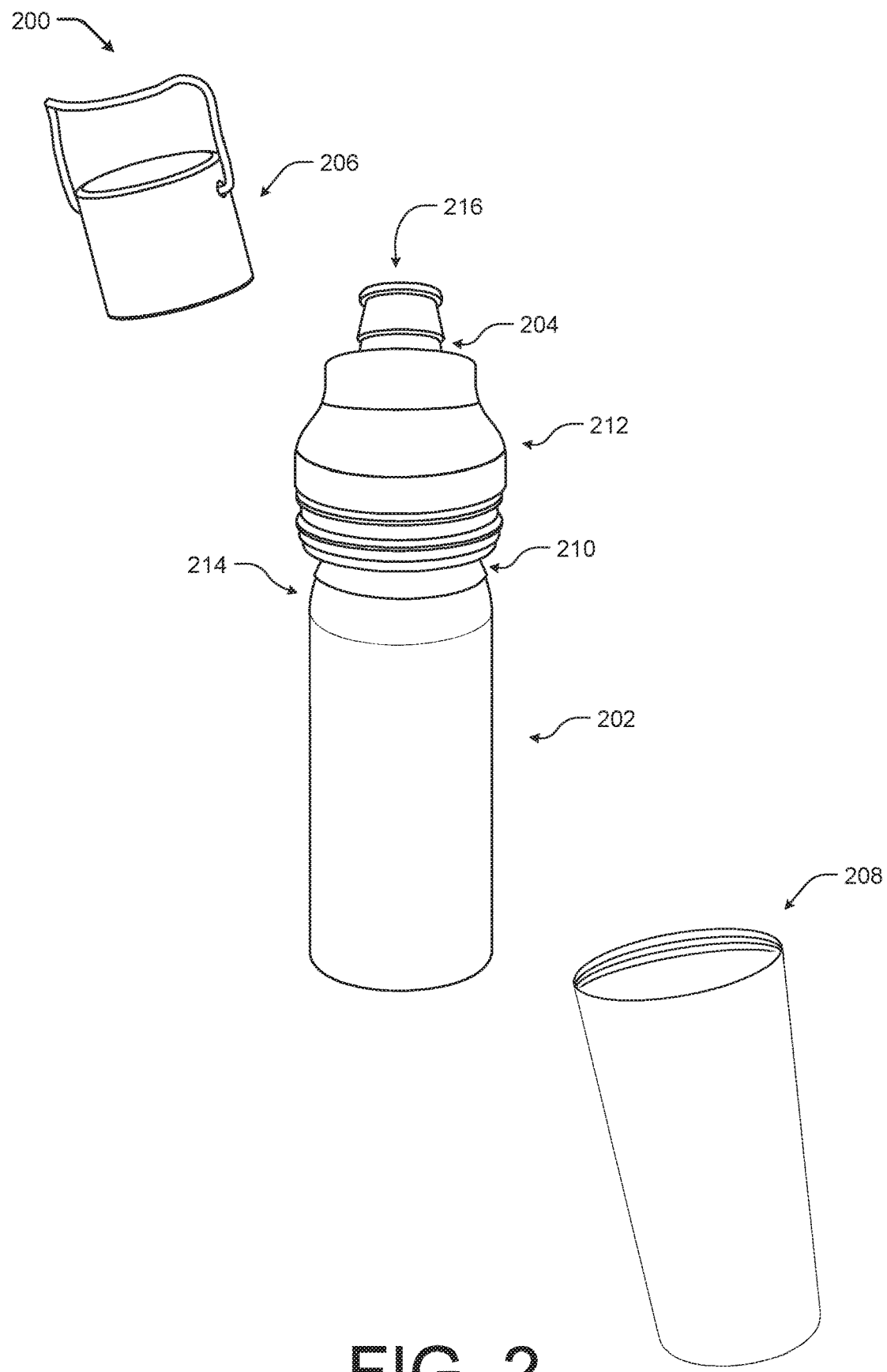
FIG. 2 illustrates a partial exploded view of a beverage container assembly for storing a beverage bottle having a neck with the cap member and body member detached from the assembly according to some implementations.

FIG. 2 illustrates a partial exploded view of a beverage container assembly 200 for storing a beverage bottle 202 having a neck 204 with the cap member 206 and body member 208 detached from the assembly according to some implementations. In the illustrated example, a flexible ring member 210 of the beverage container assembly 200 is positioned around the neck 204 of the bottle 202 and beneath a connecting neck member 212 of the beverage container assembly 200.

In the illustrated example, the connecting neck member 212 may from a rigid exterior to protect the flexible ring member 210 as well as the bottle 202 when secured to the cap member 206 and the body member 210. Thus, when fully assembled, the beverage container assembly 200 may form a rigid container to protect and house the bottle 202. The flexible ring member 210, as shown, is configured to fit between the neck 204 of the bottle 202 and the shoulder, generally indicated by 214, of the bottle 202. In this manner, the connecting neck 212 and the flexible ring member 210 may hold the bottle 202 in place regardless of size and shape of the neck 204 and/or shoulder 214.

The flexible ring member 210 may fit over the bottle such that when the connecting neck member is secured to the body member, the connecting neck member applies inward and/or downward pressure from all directions on the flexible ring member which in turn applies the inward and/or downward pressure on the shoulders of the bottle. In this manner, the pressure is able to prevent the bottle from moving within the container regardless of bottle size, dimensions, and shape. Thus, the flexible ring member allows the beverage container to accommodate and secure differing sizes of the necks associated with the bottles. For example, an individual may place the flexible ring member 210 over the neck 204 of the bottle 202, such that the flexible ring member 210 rests against the exterior of the bottle 202. The individual may also place the bottle 202 within the body member 208 (either before or after placing the flexible ring member 210 around the neck 204 of the bottle 202). Once, the bottle 202 is placed within the body member 208 and the flexible ring member 210 is placed around the neck 204 of the bottle 202, the individual may then place the connecting neck member 212 over the flexible ring member 210 as shown and secure the connecting neck member 212 to the body member 208. As the connecting neck member 212 is secured or mated to the body member 208, the connecting neck member 212 applies downward and inward pressure on the flexible ring member 210. The flexible ring member 210 then applies the downward and inward pressure on the bottle 202, to hold the bottle 202 in place within the beverage container assembly 200.

In some cases, the flexible ring member 210 may be formed from a flexible material, such as a silicone base material, rubber, or polymer. Since the flexible ring member 210 is formed from a flexible material as the flexible ring member 210 transfers the downward and inward pressure in a uniform manner to the bottle 202, thereby preventing bottles 202 formed materials, such as glass, from breaking or cracking.

In some examples, the connecting neck member may also be configured to mate with the cap member 206, such that when the cap member 206 is secured to the connecting neck member 212, the bottle 202 is sealed from leaks and spills. For example, the cap member 206 may include a stopper or rubber portion that mates with the opening 216 of the bottle 202.

Figure 3:
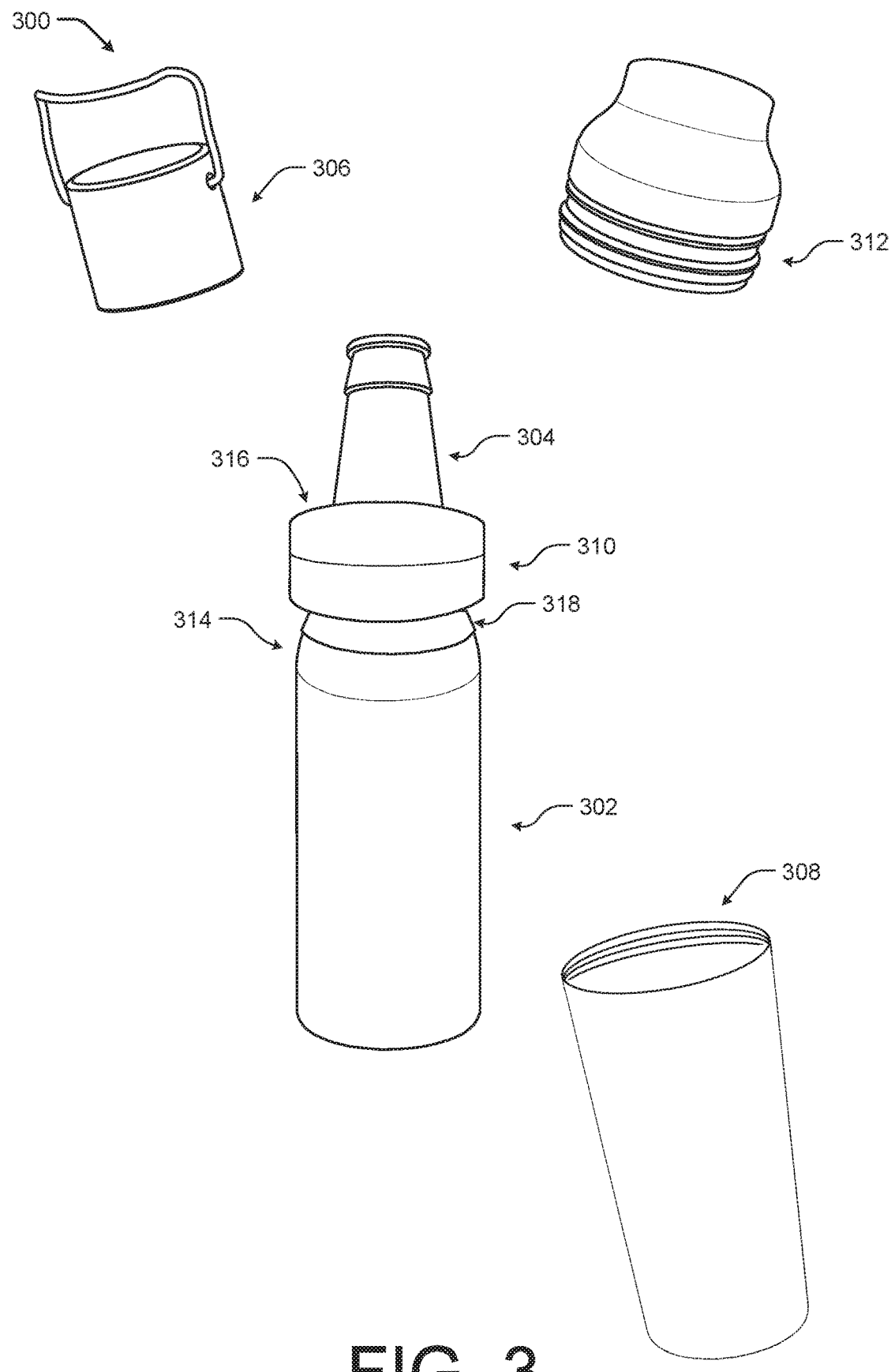
FIG. 3 illustrates a partial exploded view of a beverage container assembly for storing a beverage bottle having a neck with the cap member, body member, and connecting neck member disengaged detached according to some implementations.

FIG. 3 illustrates a partial exploded view of a beverage container assembly 300 for storing a beverage bottle 302 having a neck 304 with the cap member 306, body member 308, and connecting neck member 312 disengaged detached according to some implementations. In the illustrated example, the flexible ring member 310 is resting on the shoulder 314 of the bottle 302. In this example, the flexible ring member 310 includes a wider portion 316 that sits around the neck 304 and a narrow or flanged portion 318 that fits around the shoulder 314 of the bottle 302.

In some cases, the flexible ring member 310 may be formed from a flexible material, such as a silicone base material, rubber, polymer, or combination thereof. The flexible ring member 310 may be approximately one inch to approximately two inches in height. In one specific example, the flexible ring member 310 may be approximately one and three fourths inches tall. The flexible ring member 310 may be approximately one inch to approximately three inches across. In one specific example, the flexible ring member 310 may be approximately two and one fourth inches across.

In some examples, the flexible ring member 310 may be formed from multiple rings. For example, a first ring may be from the wider portion 316 and a second ring may form the narrow or flanged portion 318. In some cases, the material selected to form the first ring and second ring may include a coefficient of friction above a threshold coefficient of friction. For example, the first ring and second ring may have a coefficient of friction between approximately 0.25 and approximately 0.75. In another example, the first ring and second ring may have a coefficient of friction greater than approximately 0.25 or greater than approximately 0.5. In one specific example, the interior surface of the connecting neck member 312 may also be coated with a material having a coefficient of friction greater than approximately 0.25 or greater than approximately 0.5 to further prevent the flexible ring member 310 from moving within the fully assembled beverage container 300.

Figure 4:
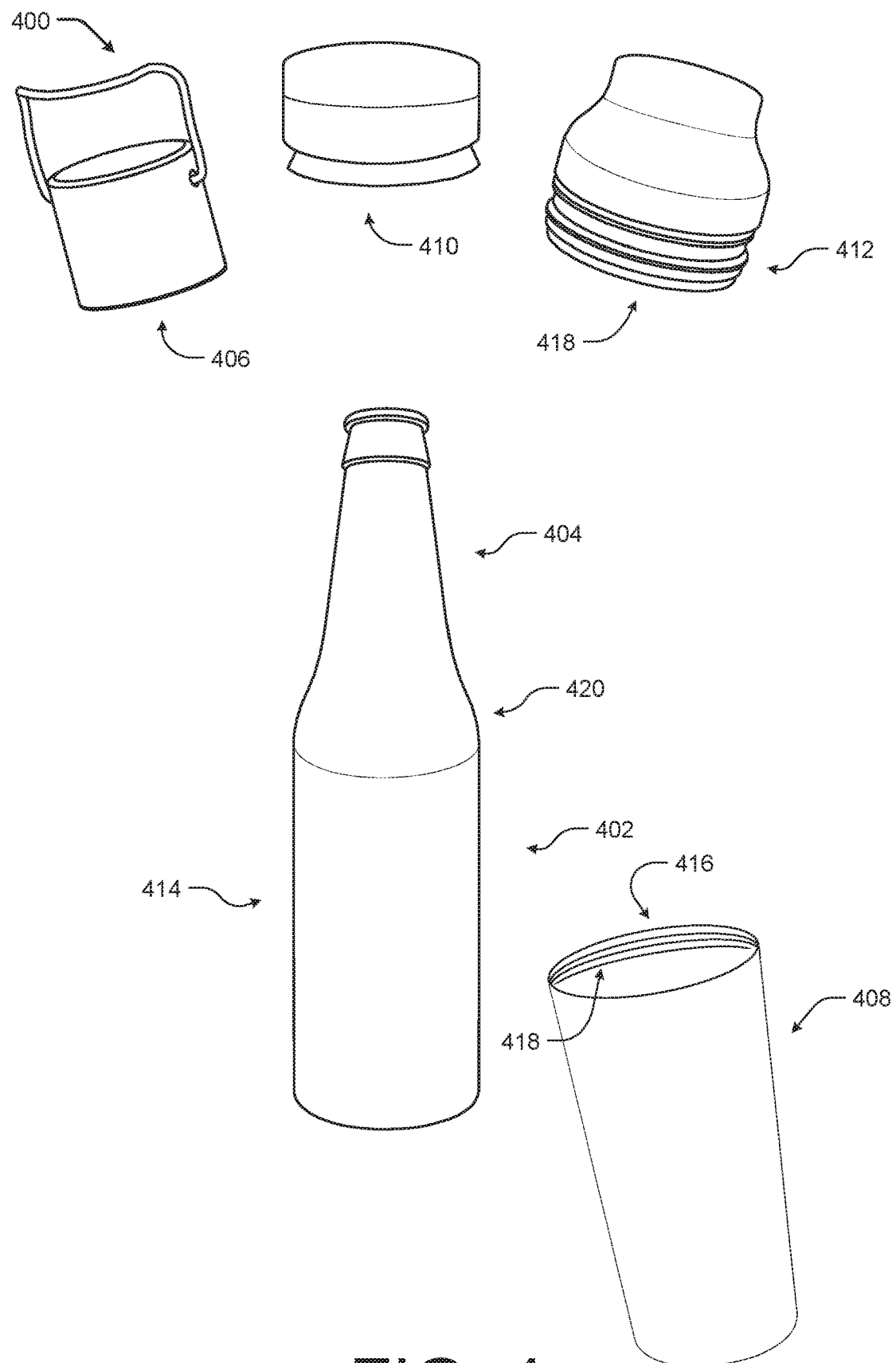
FIG. 4 illustrates a partial exploded view of a beverage container assembly for storing a beverage bottle having a neck with the cap member, body member, a flexible ring member, and a connecting neck member detached from the bottle according to some implementations.

FIG. 4 illustrates a partial exploded view of a beverage container assembly 400 for storing a beverage bottle 402 having a neck 404 with the cap member 406, body member 408, a flexible ring member 410, and a connecting neck member 412 detached from the bottle 402 according to some implementations. As shown, the beverage container assembly 400 may be formed using multiple components that interlock or assemble to form the beverage container 400 able to insulate and secure the bottle 402 during a period of time associated with consumption.

For example, in some cases, the cap member 406 may be configured to engage an opening of the bottle 402, such that when the cap member 406 is properly positioned over the opening of the bottle 402, the cap member 406 seals the contents of the bottle 402 within the bottle 402. For example, the cap member 406 may be formed from a ridged material, such as aluminum or stainless steel, and include a flexible portion protruding into the interior of the cap member 406. The flexible portion may be configured to engage the mouth or opening of the bottle, as discussed below in more detail with respect to FIG. 6.

The body member 408 may be configured to fit around the main portion or body 414 of the bottle 402, such as between a consumer's hand and the assembled beverage container 400. Thus, the body member 408 may have a body formed from stainless steel or aluminum that defines a cavity or space that is vacuum filled to provide insulting properties from both the environment and a consuming individual's hand. For example, the body member 408 may be a double walled steel vacuum design. In general, the neck 404 of the bottle 402 may extend past the top surface or rim of the body member 408.

The connecting neck member 410 may also be formed from a ridged material, such as steel or aluminum, and be configured to mate with the cap member 406 and the body member 408. For example, an individual may place the bottle 402 within the body member 408 via an opening 416 at the top of the body member 408. The individual may then mate the connecting neck member 412 with the body member 408 via, for instance, male and female threads, generally indicated by 418, on the respective members 408 and 412. The connecting neck member 412 may also be configured to mate with the cap member 406, via threads, pressure seal, etc. such that when the cap member 406 is secured to the connecting neck member 408 the bottle 402 is sealed from leaks and spills, as discussed above. In this manner, unlike conventional beverage containers that the bottle 402 is inserted via an opening in the bottom of the body member, the bottle 402 may be placed within the body member 408 via an opening 416 at the top of the body member 408, thereby reducing the risk of spills as the bottle 402 and the body member 408 remain in an upright position.

In the illustrated example, the beverage container assembly 400 includes the flexible ring member 410. The flexible ring member 410 may be configured to fit between the bottle 402 and the connecting neck 412 and/or the body member 408 of beverage container 400 to lock or hold the bottle 402 in place regardless of neck size and shape. For instance, the flexible ring member 410 is illustrated as a ring formed from a flexible material, such as a silicone base material, rubber, or polymer, that encircles the neck 404 of the bottle 402 and rests on the shoulders 420 of the bottle 402.

In the current example, the flexible ring member 410 is positioned on the bottle 402 such that when the connecting neck member 412 is secured to the body member 408, the connecting neck member 408 applies inward and/or downward pressure from all directions on the flexible ring member 410 which in turn applies the inward and/or downward pressure on the bottle 402. In this manner, the pressure acts to resist motion of the bottle 402 within the assembled beverage container 400, thereby reducing the risk of spills.

Figure 5:
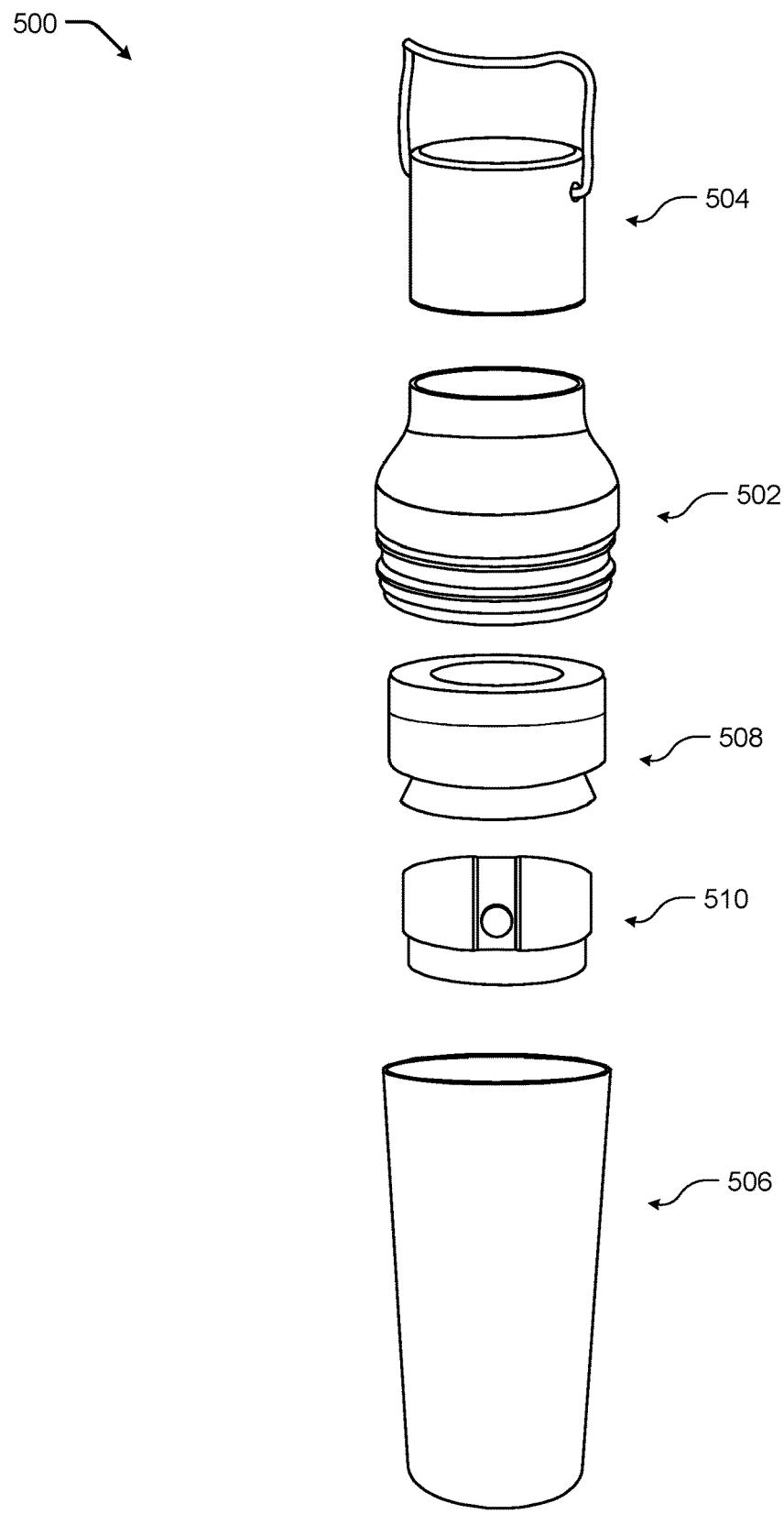
FIG. 5 illustrates an exploded view of a beverage container assembly for storing a beverage bottle having a neck according to some implementations.

FIG. 5 illustrates an exploded view of a beverage container assembly 500 for storing a beverage bottle having a neck according to some implementations. In the illustrated example, the beverage container assembly 500 includes a connecting neck member 502 that is configured to mate with or secure to a cap member 504 on one end (e.g., the top surface) and a body member 506 on the opposing end (e.g., the bottom surface). A flexible ring member 508 may be positioned under the connecting neck member 502, such that as the connecting neck member 502 is tightened onto the body member 506, the flexible ring member 508 and the connecting neck member 502 apply inward pressure to the bottle within the assembly 500 to hold the bottle in place.

In some cases, the flexible ring member 508 may be formed from multiple rings. For example, a freezer pack ring 510 may be configured to fit or mate within the flexible ring member 508. For example, the freezer pack ring 510 may be filled with water, a superabsorbent hydrogel, a superabsorbent polymer, a refrigerant gel, which may include water, a water-soluble starch, a water-soluble cellulose, or combination thereof that is capable of freezing when placed in a standard freezer unit. The freezer pack ring 510 thus may be able to be placed by an individual within a freezer until frozen, then placed adjacent to or against the surface of the bottle, as discussed above, in order to not only resist a warming effect on the content of the bottle caused by the environmental temperature on the bottle but also to cool the contents of the bottle or cause the temperature of the contents of the bottle to decrease during the period of time associated with consumption.

Figure 6:
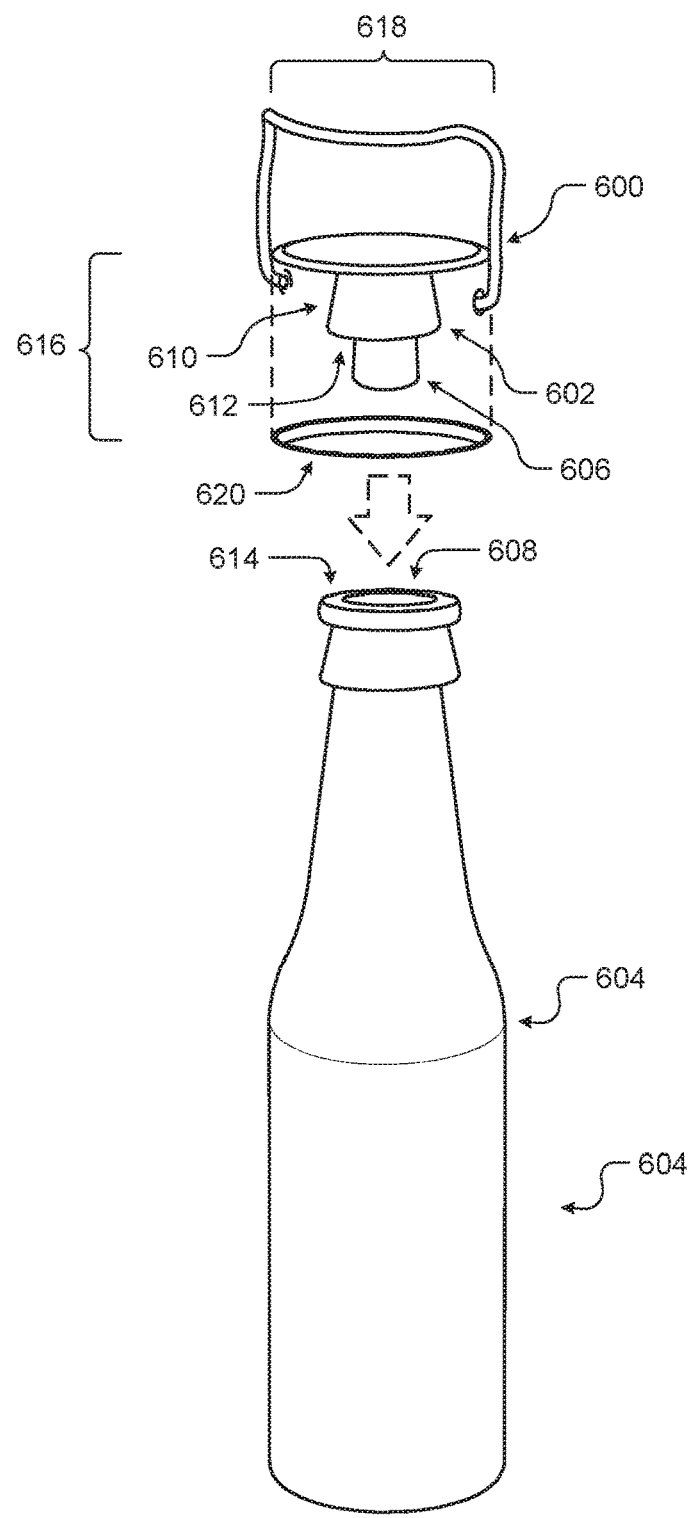
FIG. 6 is an example view of the cap member showing a stopper configured to close or re-seal the bottle during use according to some implementations.

FIG. 6 is an example view of the cap member 600 having a stopper 602 configured to close or re-seal the bottle 604 during use according to some implementations. In the illustrated example, the stopper 602 is positioned within the interior cavity of the cap member 600. The stopper 602 may include a narrow portion 606 configured to be received within the mouth 608 of the bottle 604 and a wider portion 610 forming a ledge 612 in combination with the narrow portion 606. The ledge 612 may be configured to mate against the top surface 614 of the mouth 608 of the bottle 604. Thus, the combination of the narrow portion 606 within the mouth 608 of the bottle 604 and the ledge 612, the bottle 604 may be re-sealed when the cap member 600 is applied to a reminder of the beverage container assembly (not shown).

In the illustrated example, the cap member 600 may include a height 616 that ranges from between approximately one inch and three inches. In one specific example, the cap member 600 may have a height 716 of approximately one and half inches. The cap member 600 may also have a width, generally indicated by 718, of between approximately one inch and two inches. In one specific example, the cap member 600 may have a width 718 of approximately one and half inches. In some cases, the cap member 600 may be formed from Polypropylene (PP). In one specific instance, the cap member 600 may include a silicone ring 620 extending below a bottom surface to assist with securing the cap member 600 to the connecting neck member. Alternatively, the cap member 600 may include threads that may screw into opposing threads on a connecting neck member.

Figure 7:
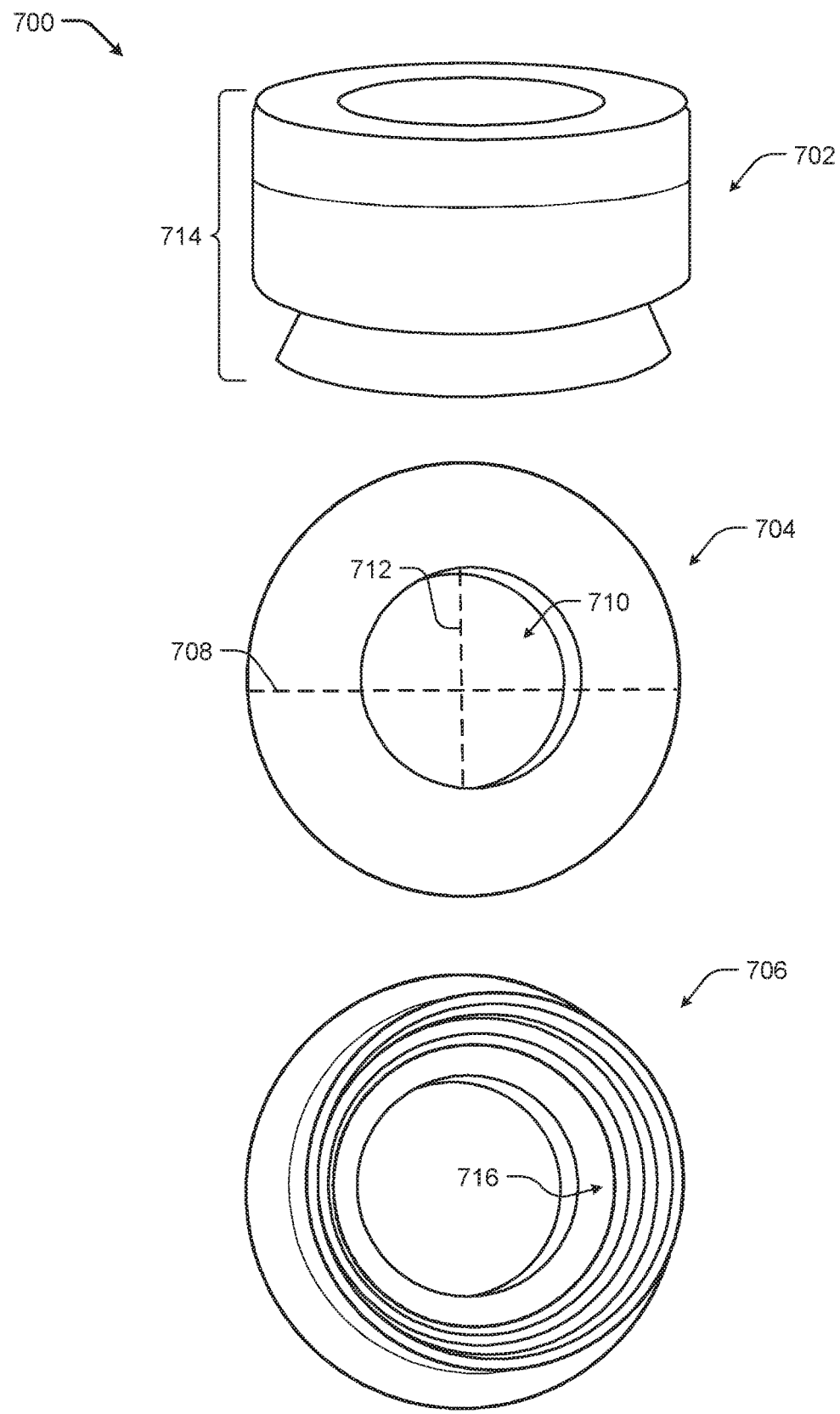
FIG. 7 is an example top and bottom view of a flexible ring member used as part of the beverage container assembly according to some implementations.

FIG. 7 is an example top and bottom view of a flexible ring member 700 used as part of the beverage container assembly according to some implementations. In the current example a side view 702 of the flexible ring member 700, a top view 704 of the flexible ring member 700, and a bottom view 706 of the flexible ring member 700 is shown. As discussed above, the flexible ring member 700 may be formed from a flexible material, such as a silicone base material, rubber, polymer, or combination thereof.

In some cases, the flexible ring member 700 may be between approximately one and half inches and approximately three inches across or in width as shown along line 708 (e.g., from exterior surface to exterior surface). In one specific example, the width of the flexible ring member 700 along line 708 may be approximately two inches. In another specific example, the width of the flexible ring member 700 along line 708 may be approximately two and half inches. In some cases, the flexible ring member 700 may have an opening 710 that has a circular shape for receiving a neck of a bottle and is approximately half an inch to approximately two inches across or in width as shown along line 712 (e.g., from interior surface to interior surface). In one specific example, the width of the flexible ring member 700 along line 712 may be approximately one inch. In another specific example, the width of the flexible ring member 700 along line 712 may be approximately one and half inches.

The flexible ring member 700 may also have a height 714 that varies from approximately one inch to approximately three inches. In one specific example, the height 714 of the flexible ring member 700 is approximately one and three fourths inches. In the illustrated example, as shown in the bottom view 706 of the flexible ring member 700, the interior surface may include ribs or texture 716 that may assist the flexible ring member 700 in gripping or maintaining a hold on a glass bottle.

In some cases, the flexible ring member 700 may include a freezer pack or element, such as water, a refrigerant gel, which may include water, a water-soluble starch, a water-soluble cellulose, a superabsorbent hydrogel, a superabsorbent polymer, or combination thereof. The freezer element may be configured to freeze when placed in a freeze unit, deep chill unit, etc. Thus, the freezer element may act to cool or resist a warming of the contents of a bottle placed within the beverage container. In some examples, such as the example, illustrated with respect to FIG. 8, the freezer element may be formed by an individual member of the beverage container assembly and configured to be received within the flexible ring member 700 or at a position between a bottle and the flexible ring member 700 when in use.

Figure 8:
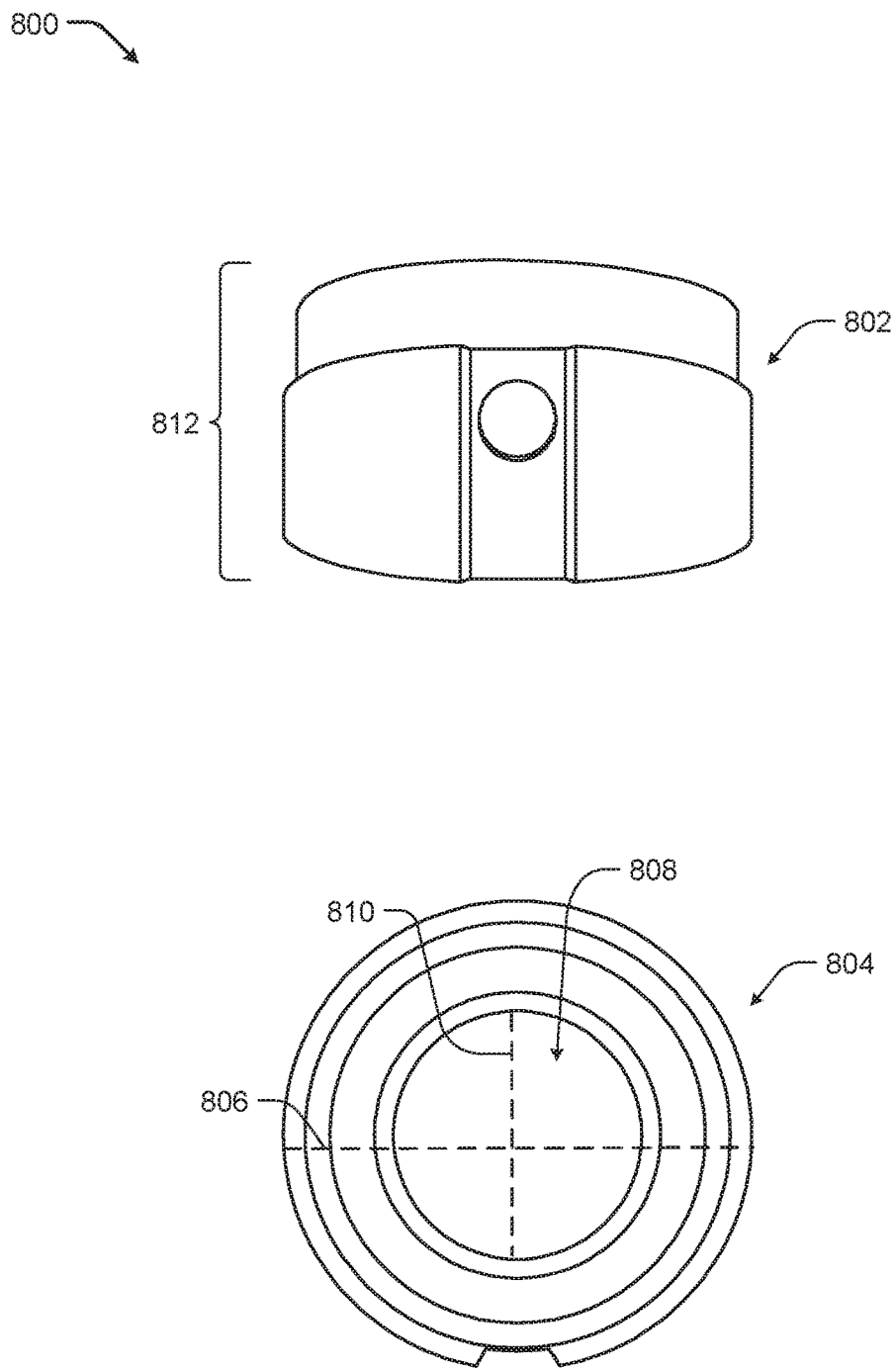
FIG. 8 is an example top and bottom view of a freezer element 800 of a flexible ring member of the beverage container assembly according to some implementations.

FIG. 8 is an example top and bottom view of a freezer member 800 of a flexible ring member of the beverage container assembly according to some implementations. In the current example a side view 802 and a top view 804 of the freezer member 800 is shown. As discussed above, the freezer member 800 may be configured to form an inner ring of the flexible ring member and may be formed from a flexible material, such as a silicone base material, rubber, polymer, or combination thereof. In some cases, the freezer member 800 may include a freezer pack or element, such as water, a refrigerant gel, which may include water, a water-soluble starch, a water-soluble cellulose, a superabsorbent hydrogel, a superabsorbent polymer, or combination thereof. The freezer element may be configured to freeze when placed in a freeze unit, deep chill unit, etc. Thus, the freezer element may act to cool or resist a warming of the contents of a bottle placed within the beverage container.

In some examples, the freezer member 800 may be formed as an individual member of the beverage container assembly and configured to be received within the flexible ring member or at a position between a bottle and the flexible ring member when in use. In some cases, the freezer member 800 may be between approximately one inch and approximately three inches across or in width as shown along line 806 (e.g., from exterior surface to exterior surface). In one specific example, the width of the freezer member 800 along line 806 may be approximately two and one-fourth inches. In another specific example, the width of the freezer member 800 along line 806 may be approximately two inches. In some cases, the freezer member 800 may have an opening 808 that has a circular shape for receiving a neck of a bottle and is approximately half an inch to approximately one and half inches across or in width as shown along line 810 (e.g., from interior surface to interior surface). In one specific example, the width of the freezer member 800 along line 808 may be approximately one inch. In another specific example, the width of the freezer member 800 along line 808 may be approximately half an inch. The freezer member 800 may also have a height 812 that varies from approximately one inch to approximately three inches. In one specific example, the height 812 of the freezer member 800 is approximately one and half inches.

Figure 9:
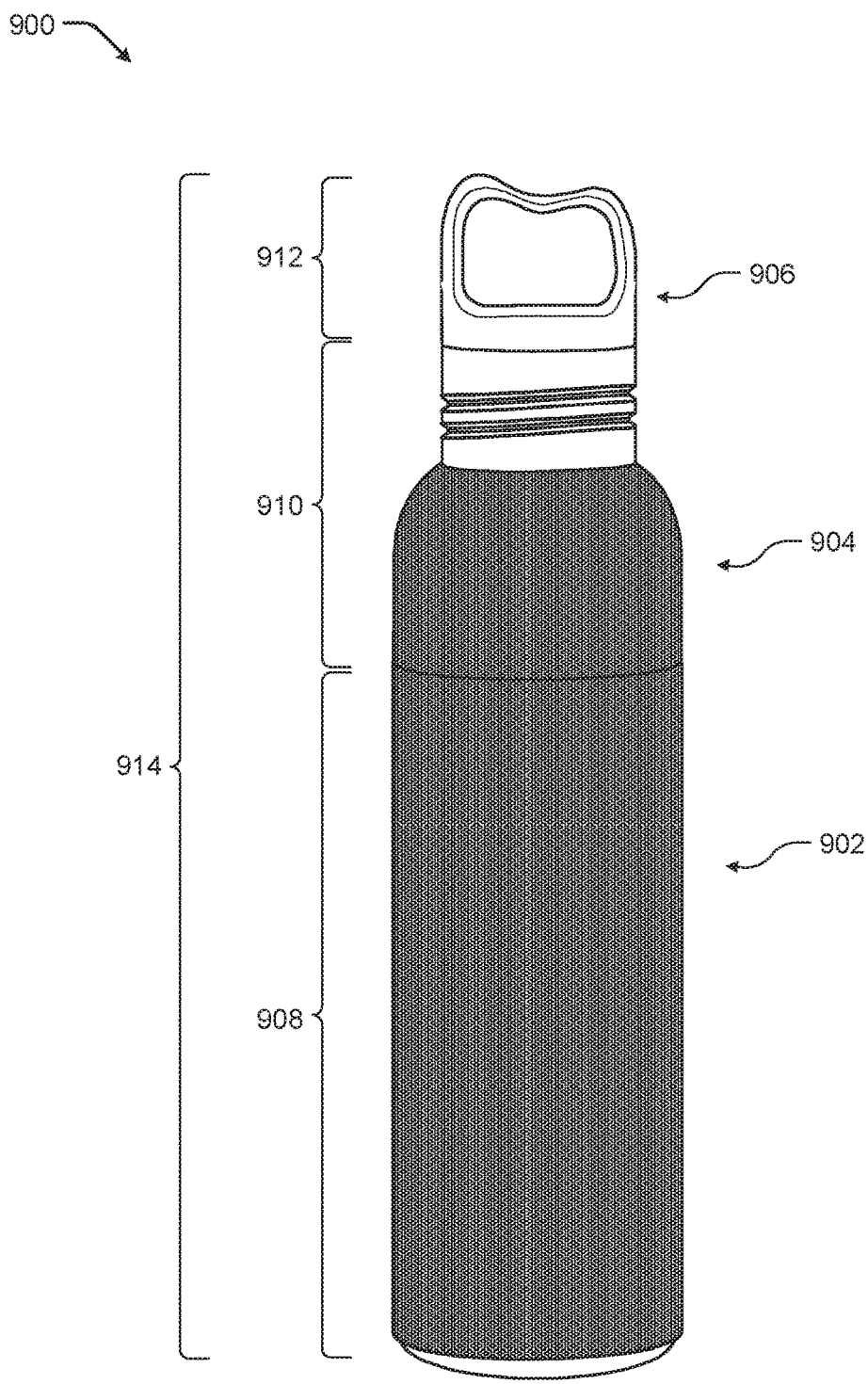
FIG. 9 is an example exterior view of a beverage container for storing a beverage bottle having a neck according to some implementations.

FIG. 9 is an example exterior view of a beverage container 900 for storing a beverage bottle having a neck according to some implementations. In the current example, a body member 902, connecting neck member 904, and cap member 906 is shown. The body member 902, the connecting neck member 904, and the cap member 906 are also coated with polyurethane coating to provide a better grip then a metallic or polymer exterior, which often becomes wet and slippery during consumption of a beverage. In some cases, the polyurethane coating may be sprayed onto the exterior surface of the beverage container 900 as a finishing stage during manufacturing.

In the current example, the body member 902 may have a height 908 that ranges from approximately six inches in height to approximately twelve inches in height. In one specific example, the height 908 may be approximately seven inches. The body member 902 may also have a diameter that is between approximately two inches and approximately four inches across. In one specific example, the diameter may be approximately three inches across.

In the current example, the connecting neck member 904 may have a height 910 that ranges from approximately one inch in height to approximately four inches in height. In one specific example, the height 910 may be approximately two and a half inches. The connecting neck member 904 may also have a diameter that may vary from a narrow top of between approximately one inches and approximately two inches across and a wider base that may vary from between approximately two inches and approximately four inches across. In one specific example, the diameter may be approximately one and thirteen-sixteenth inches across.

The cap member 906 may include a height 912 that ranges from between approximately one inch and three inches. In one specific example, the cap member 906 may have a height 912 of approximately one and half inches. The cap member 906 may also have a width of between approximately one inch and two inches. In one specific example, the cap member 906 may have a width of approximately one and half inches.

In one particular example, the beverage container 900 from the top surface of the cap member 906 and the bottom surface of the body member 902 may have a height 914 of between be approximately twelve inches and 8 inches.

Figure 10:
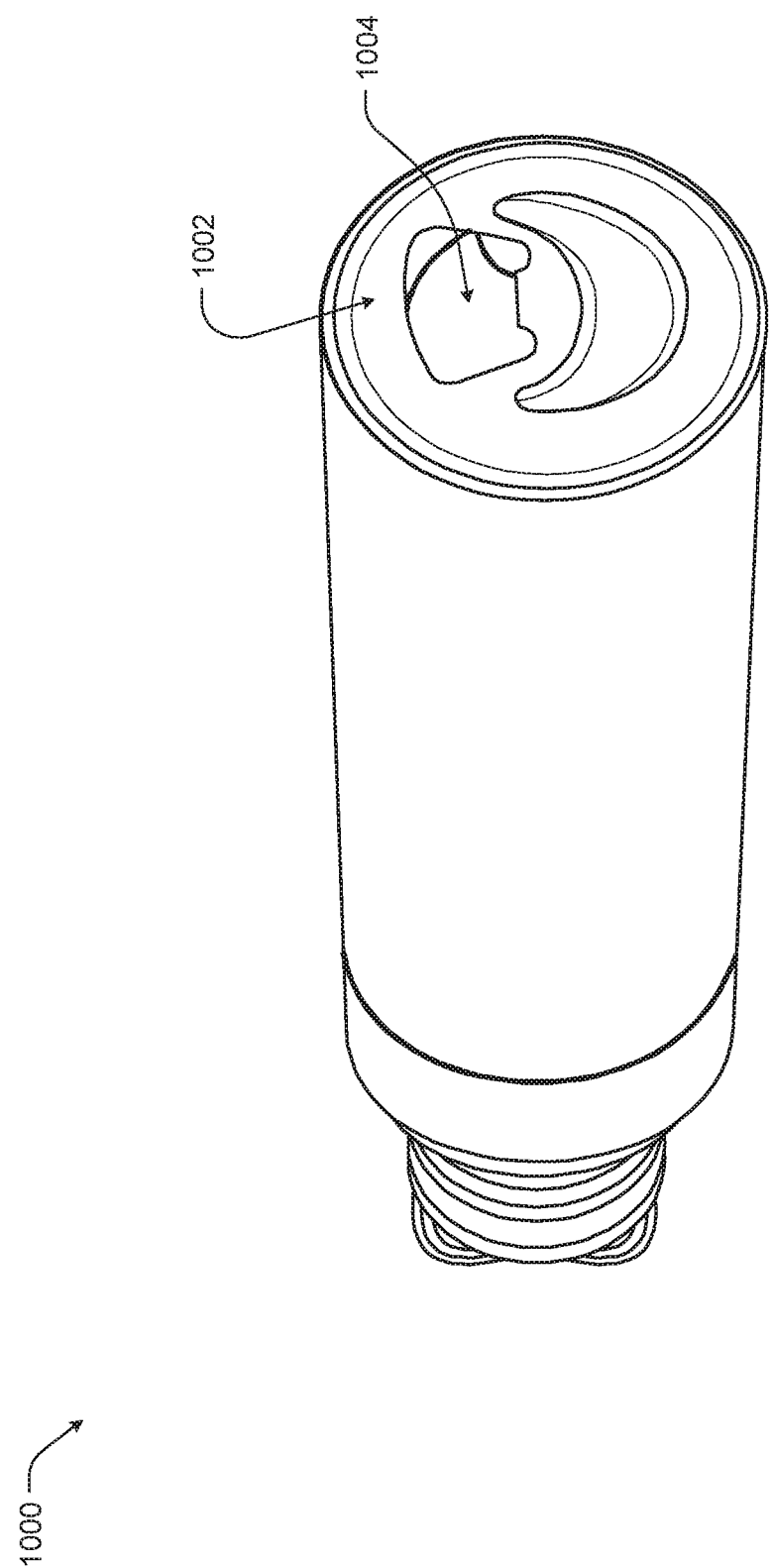
FIG. 10 is an example bottom view of a beverage container for storing a beverage bottle having a neck according to some implementations.
Figure 11:
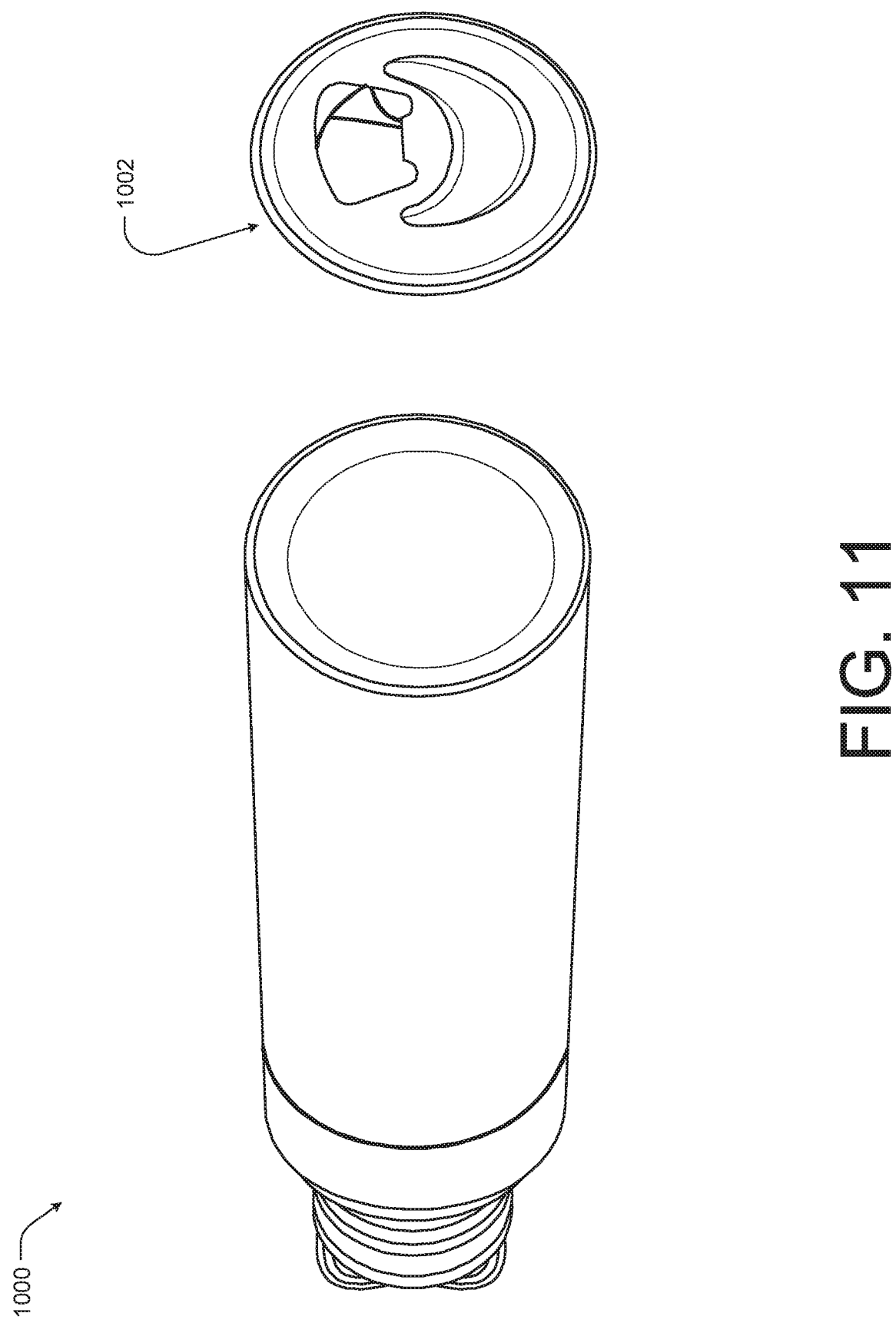
FIG. 11 is another example bottom view of the beverage container of FIG. 10 according to some implementations.

FIG. 10 is an example bottom view of a beverage container 1000 for storing a beverage bottle having a neck according to some implementations. In the current example, the bottom surface having a bottle opener plate 1002 of the beverage container 1000 may include a bottle opener 1004. In some cases, as illustrated in FIG. 11 the bottle opener plate 1002 may be configured to be removable from the body member of the beverage container 1000. In this manner, the bottle opener 1004 may be utilized while a bottle is stored within the beverage container 1000 without causing a spill or leak. For example, the user desiring to open the bottle does not have to hold the beverage container 1000 at an awkward angle or position to place a second bottle under the bottle opener to remove the cap. Additionally, the user no longer has to worry about applying opposing force to the beverage container 1000 and the second bottle while opening, thus further reducing the risk of a spill.

Figure 12:
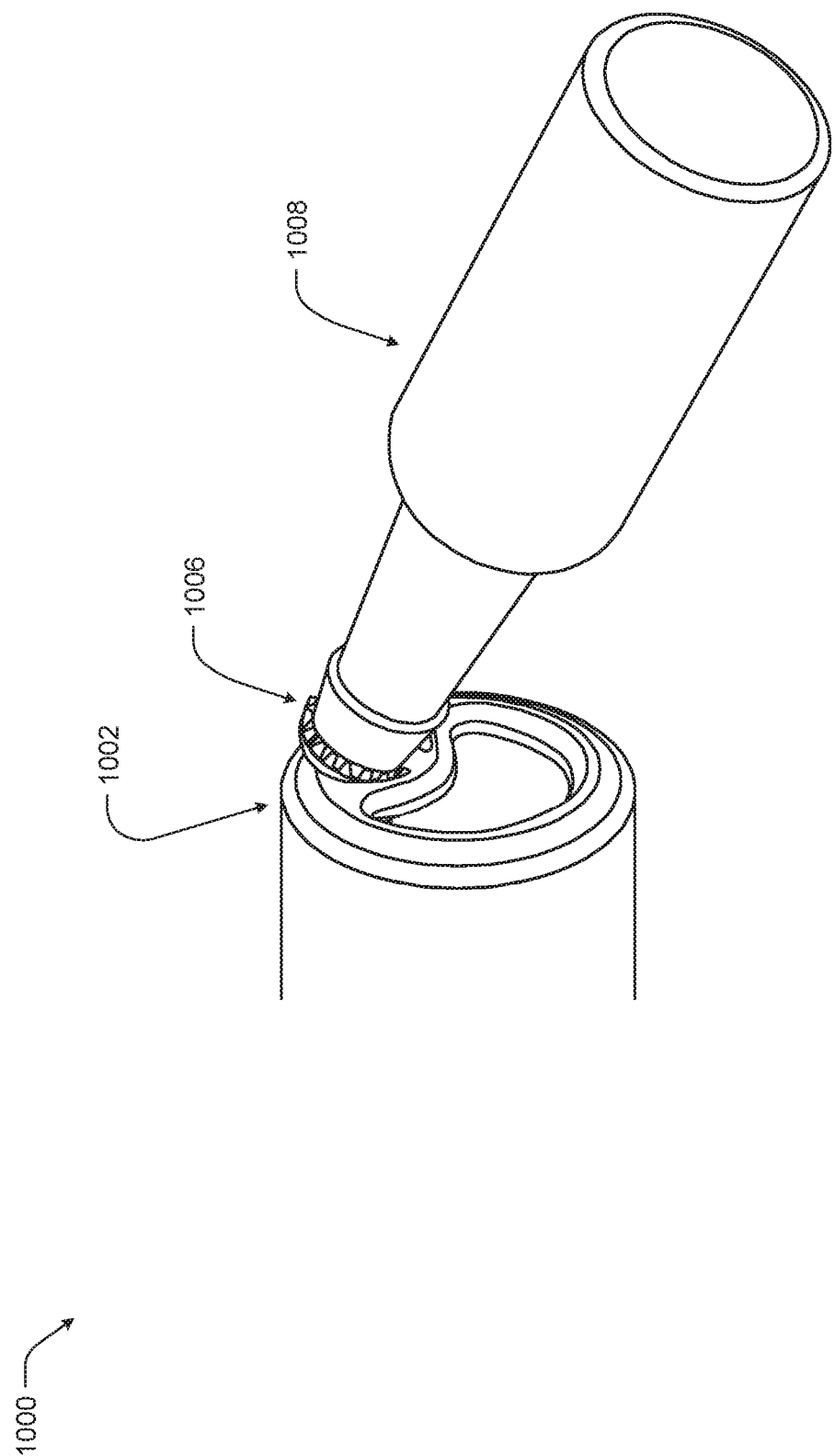
FIG. 12 is another example bottom view of the beverage container of FIG. 10 according to some implementations.

FIG. 12 is another example bottom view of the beverage container 1000 of FIG. 10 according to some implementations. In the illustrated example, a user is in the process of removing a lid 1006 of a bottle 1008, while the bottle opener plate 1002 is attached to the beverage container 1000.

Figure 13:
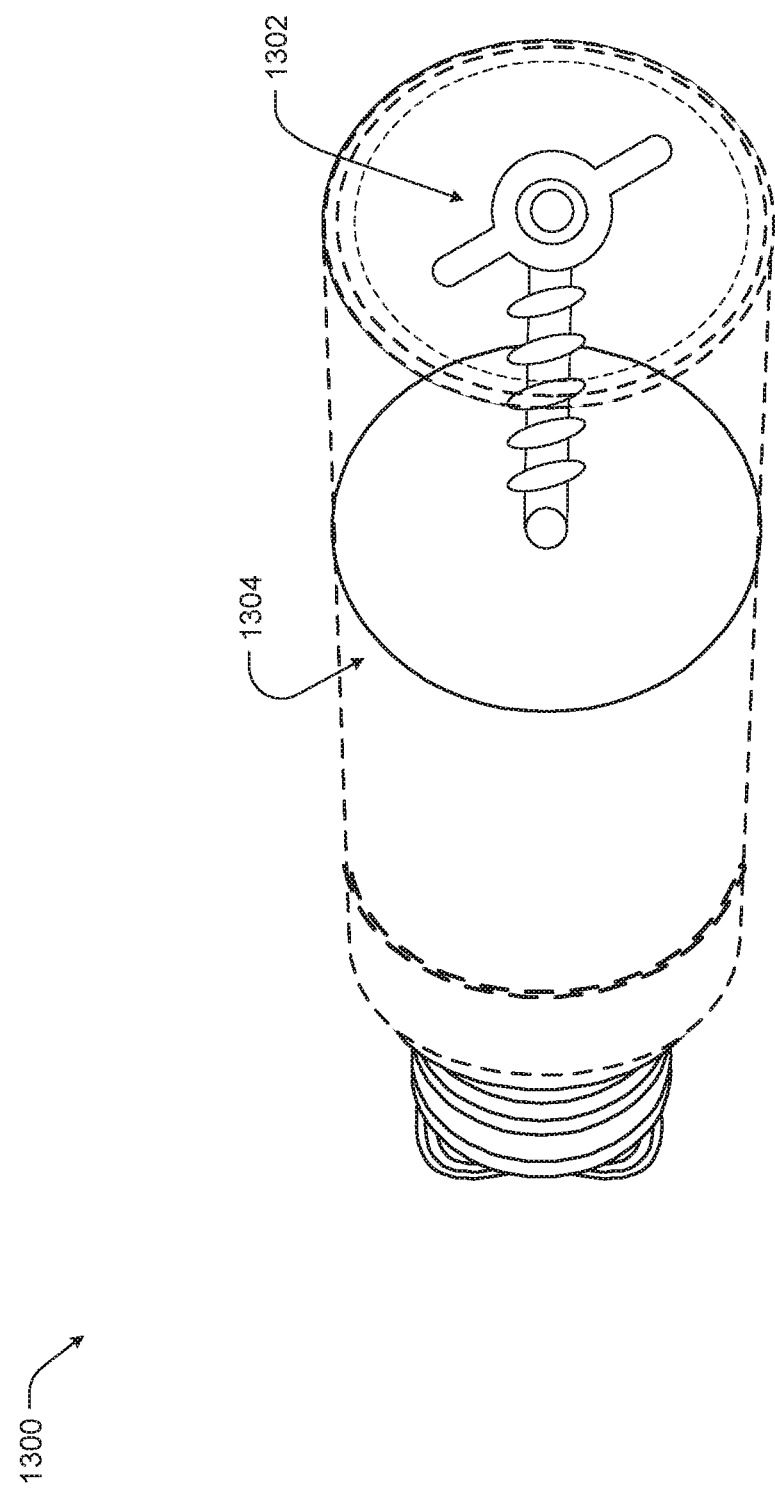
FIG. 13 is another example bottom view of the beverage container according to some implementations.

FIG. 13 is another example bottom view of the beverage container 1300 according to some implementations. In the current example, the bottle opener plate shown in FIGS. 10-12 has been removed to allow a user to access a bottle size controller 1302. Thus, in some examples, the bottle opener plate may be utilized to hide or prevent inadvertent adjustments of a position of the bottom 1304 of the beverage container 1300.

The bottle size controller 1302 may include a mechanism or device to allow the interior bottom surface 1304 of the beverage container 1300 to be adjusted upward to, for example, accommodate bottles with varying sized bodies. For example, the user may twist or screw the bottle size controller 1302 to cause the interior surface or bottom 1304 of the beverage container 1300 to move vertically within the interior of the beverage container 1300. It should be understood that while a screw or twist bottle size controller 1302 is illustrated, that various other devices may be utilized for adjusting the position of the bottom 1304 of the beverage container 1300.

What is claimed is:

1. A beverage container assembly for housing a bottle having a neck, a shoulder, and a body, the beverage container assembly comprising:
   a cap member, the cap member including a hollow area for receiving at least a portion of the neck of the bottle;
   a body member forming a cavity for releasably coupling to the bottle, the body member having a height to allow at least a portion of the neck of the bottle extends behind the top surface of the body member;
   a connecting neck member configured to releasably couple with the cap member on a top end and releasably couple the body member at a bottom end, the bottom end opposite the top end, the connecting neck member to enclose at least a portion of the neck of the bottle;
   a bifurcated mating ring member, the bifurcated mating ring member including a flexible ring member and a ring shaped freezer member physical distinct and separable from the flexible ring member, the flexible ring member having an exterior side surface and an exterior flat top surface in physical contact with at least a portion of the connecting neck member and the ring shaped freezer member releasably mated to an interior surface of the flexible ring member, the interior surface of the flexible ring member in physical contact with the neck of the bottle and the flexible ring member in physical contact with the shoulder of the bottle, the ring shaped freezer member having an interior surface in physical contact with the shoulder and neck of the bottle, the ring shaped freezer member filled with a freezer element; and
   a bottle opener plate on a bottom surface of the body member, the bottom surface opposite the top surface of the body member, the bottle opener plate including a bottle opener.

2. The beverage container assembly as recited in claim 1, wherein the body member forms a double wall vacuum to provide insulting properties.

3. The beverage container assembly as recited in claim 1, wherein the freezer element is at least one of water, a superabsorbent hydrogel, a superabsorbent polymer, or a refrigerant gel.

4. The beverage container assembly as recited in claim 1, wherein the cap member, connecting neck member, and body member are formed from stainless steel.

5. The beverage container assembly as recited in claim 1, wherein the bottle opener plate is configured to releasably couple to the bottom surface of the body member.

6. The beverage container assembly as recited in claim 1, wherein the cap member includes a stopper configured to seal an opening of the bottle when coupled to the connecting neck member.

7. The beverage container assembly as recited in claim 1, wherein at least a portion of an exterior surface of the cap member, the connecting neck member, and the body member are coated with Polypropylene.

8. A beverage container assembly comprising:
   a body member for receiving a bottle, the body member having a height to allow at least a portion of a neck of the bottle to extend behind the top surface of the body member;
   a connecting neck member configured to releasably couple the body member at a first end, such that the neck of the bottle extends out of a second end of the connecting neck member during use, the second end opposite the first end; and
   a bifurcated mating ring member, the bifurcated mating ring member including a first flexible ring member and a second ring member, the second ring member physically distinct from the first ring member such that the second ring member nests within an opening of the first flexible ring member, the first flexible ring member positioned at least partially between the connecting neck member and the bottle to transfer a downward and inward pressure from the connecting neck member to a neck of the bottle and a shoulder of the bottle and the second flexible ring member positioned at least partially between the first flexible ring member and the bottle to transfer the downward and inward pressure from the connecting neck member and the first flexible ring member to the shoulders of the bottle.

9. The beverage container assembly as recited in claim 8, further comprising a bottle opener plate on a bottom surface of the body member, the bottom surface opposite the top surface of the body member, the bottle opener plate including a bottle opener.

10. The beverage container assembly as recited in claim 9, wherein the bottle opener plate is configured to detach from the body member.

11. The beverage container assembly as recited in claim 8, wherein the second ring member is a ring shaped freezer member including an exterior surface and an interior filled with a freezer element.

12. The beverage container assembly as recited in claim 8, further comprising a cap member configured to releasably couple to the connecting neck member at the second end.

13. The beverage container assembly as recited in claim 12, wherein the cap member includes a stopper configure to mate with an opening of the bottle when the cap member is coupled to the connecting neck member.

14. A beverage container assembly comprising:
   a cap member, the cap member including a hollow area for receiving at least a portion of the neck of a bottle;
   a connecting neck member to enclose at least a portion of the neck of the bottle, the connecting neck member having first opening at a top end, a second opening at a bottom end opposite the top end, and a threaded portion along an exterior surface at the bottom end to releasably couple with the cap member on the top end and releasably couple the body member at the bottom end;
   a body member having an opening for receiving the bottle on one end, the opening defining an interior surface of the body member, the interior surface of the body member having a threaded portion to releasably mate to the threaded portion of the connecting neck member and wherein the body member has a height to allow at least a portion of the neck of the bottle extends behind the top surface of the body member; and
   a bifurcated mating ring member, the bifurcated mating ring member including a flexible ring member and a ring shaped freezer member physical distinct and separable from the flexible ring member, the flexible ring member having an exterior side surface and an exterior flat top surface in physical contact with at least a portion of the connecting neck member and the ring shaped freezer member releasably mated to an interior surface of the flexible ring member, the interior surface of the flexible ring member in physical contact with the neck of the bottle and the flexible ring member in physical contact with the shoulder of the bottle, the ring shaped freezer member having an interior surface in physical contact with the shoulder and neck of the bottle, the ring shaped freezer member filled with a freezer element; and a bottle opener plate on a bottom surface of the body member, the bottle opener plate including a bottle opener.

15. The beverage container assembly as recited in claim 14, wherein the first flexible ring member is formed from a silicone material.

16. The beverage container assembly as recited in claim 14, wherein the ring shaped freezer member is formed from silicone.

17. The beverage container assembly as recited in claim 14, wherein the ring shaped freezer member is flexible.

18. The beverage container assembly as recited in claim 14, wherein the cap member includes a stopper configured to seal an opening of the bottle when coupled to the connecting neck member.

19. The beverage container assembly as recited in claim 14, wherein the bottle opener plate is configured to releasably couple to the bottom surface of the body member.

20. The beverage container assembly as recited in claim 14, wherein the body member forms a double wall vacuum to provide insulting properties.

* * * * *